(12) United States Patent
Merrick et al.

(10) Patent No.: US 12,442,803 B2
(45) Date of Patent: Oct. 14, 2025

(54) FLOW SPLITTER FOR GAS CHROMATOGRAPHY SYSTEMS

(71) Applicant: LECO Corporation, St. Joseph, MI (US)

(72) Inventors: Mark Firmer Merrick, Bridgman, MI (US); David Jesse Borton, St. Joseph, MI (US)

(73) Assignee: LECO Corporation, St. Joseph, MI (US)

( * ) Notice: Subject to any disclaimer, the term of this patent is extended or adjusted under 35 U.S.C. 154(b) by 135 days.

(21) Appl. No.: 18/263,638

(22) PCT Filed: Jan. 11, 2022

(86) PCT No.: PCT/US2022/011989
§ 371 (c)(1),
(2) Date: Jul. 31, 2023

(87) PCT Pub. No.: WO2022/164627
PCT Pub. Date: Aug. 4, 2022

(65) Prior Publication Data
US 2024/0310337 A1    Sep. 19, 2024

Related U.S. Application Data

(60) Provisional application No. 63/144,245, filed on Feb. 1, 2021.

(51) Int. Cl.
*G01N 30/72* (2006.01)
*G01N 30/10* (2006.01)
(Continued)

(52) U.S. Cl.
CPC ......... *G01N 30/7213* (2013.01); *G01N 30/10* (2013.01); *G01N 30/32* (2013.01);
(Continued)

(58) Field of Classification Search
None
See application file for complete search history.

(56) References Cited

U.S. PATENT DOCUMENTS 3,498,027 A * 3/1970 Buchtel, Jr. ............ G01N 30/38
137/561 R
3,712,111 A * 1/1973 Llewellyn .............. G01N 30/84
250/288

(Continued)

FOREIGN PATENT DOCUMENTS

| JP | 2004-205313 A | 7/2004 |
| JP | 2011524008 A | 8/2011 |
| JP | 2020536232 A | 12/2020 |

OTHER PUBLICATIONS

Borman, S., "Eluent, Effluent, Eluate, and Eluite", Focus, Analytical Chemistry, vol. 59, No. 2, Jan. 15, 1987, pp. 99A.*
(Continued)

*Primary Examiner* — Daniel S Larkin
(74) *Attorney, Agent, or Firm* — Honigman LLP

(57) ABSTRACT

An analytical instrument assembly includes a gas chromatograph, a first detector, a second detector, and a pneumatic control module. The gas chromatograph includes a flow splitter configured to receive a sample. The first detector is coupled to the flow splitter. The second detector is coupled to the flow splitter. The pneumatic control module is coupled to the flow splitter and configured to deliver a carrier gas to the flow splitter. The flow splitter is configured to split the sample and deliver at least a first portion of the sample to the first detector and at least a second portion of the sample to the second detector at a first split ratio. The pneumatic control module is configured to deliver one of (i) a makeup flow including a third portion of the carrier gas to the flow splitter or (ii) an exhaust flow out of the flow splitter, wherein the pneumatic control module is configured to
(Continued)

regulate the pressure within the flow splitter to thereby maintain the first split ratio at a substantially constant value.

20 Claims, 13 Drawing Sheets

(51) Int. Cl.
| | |
|---|---|
| *G01N 30/32* | (2006.01) |
| *G01N 30/46* | (2006.01) |
| *G01N 30/68* | (2006.01) |
| *G01N 30/78* | (2006.01) |
| *G01N 30/02* | (2006.01) |

(52) U.S. Cl.
CPC ........... *G01N 30/465* (2013.01); *G01N 30/68* (2013.01); *G01N 30/78* (2013.01); *G01N 2030/025* (2013.01)

(56) References Cited

U.S. PATENT DOCUMENTS

| | | | |
|---|---|---|---|
| 8,413,484 B2 | 4/2013 | Lubkowitz et al. | |
| 8,549,894 B2* | 10/2013 | Hoogerwerf | G01N 30/32 73/23.42 |
| 2015/0153314 A1* | 6/2015 | Karoum | G01N 30/46 73/23.36 |
| 2018/0238840 A1* | 8/2018 | Masuda | G01N 30/24 |
| 2020/0132641 A1* | 4/2020 | Cardin | G01N 30/32 |
| 2020/0340958 A1 | 10/2020 | Jang et al. | |

OTHER PUBLICATIONS

Japanese Patent Office, 2nd Office Action for Application No. 2023-546161 dated Aug. 30, 2024.
WIPO, International Preliminary Report on Patentability and Written Opinion for Application PCT/US2022/011989 dated Jul. 31, 2023.
International Search Report and Written Opinion for Application PCT/US2022/011989 dated Apr. 29, 2022.
Agilent Technologies Inc., Brochure, "Capillary Flow Technology: Splitters, Get More Information in Less Time", 2013, <URL: https://www.agilent.com/cs/library/brochures/5989-9667EN.pdf> (the whole document).
Bramston-Cook, R. et al., "Combining GC detectors with Mass Spectrometers", Lotus Consulting, 2015, <URL: http://lotusinstruments.com/wp/wp-content/uploads/Combining-GC-Detectors-with-Mass-Spectrometers-Ver-2.pdf. (the whole document).
Dabrowski, L., "Multidetector systems in gas chromatrography", Trends in Analytical Chemistry, 2018, vol. 102, pp. 185-193 (the whole document).
Japanese Patent Office, Office Action for Application No. 2023-546161 dated Dec. 22, 2023.

* cited by examiner

FLOW SPLITTER FOR GAS CHROMATOGRAPHY SYSTEMS

CROSS REFERENCE TO RELATED APPLICATIONS

The present application is a 371 National Stage entry based on International Application No. PCT/US2022/011989, filed on Jan. 11, 2022, which claims priority to U.S. Provisional Application No. 63/144,245 filed on Feb. 1, 2021. The entire contents of the above-identified applications are hereby incorporated by reference for all purposes.

TECHNICAL FIELD

This disclosure relates to flow splitters for gas chromatography systems.

BACKGROUND

Gas chromatography (GC) is conventionally used to separate and analyze compounds (e.g., volatile organic compounds (VOCs)) in a variety of applications and across a number of disciplines. Traditional gas chromatography may involve the combination of a sample, or mixture of analytes, to be analyzed with a carrier gas (e.g., helium or hydrogen) within a column to form an effluent. As the effluent moves through the column, various analytes may be separated from one another due to a variety of factors, such as, for example, flow characteristics, mass of the analyte, etc. Upon exiting the column, the signal of the separated analytes may be detected and recorded.

When two or more analytes of a sample have similar characteristics, it may be difficult to separate such analytes because they may tend to move at similar velocities through the column such that a sufficient amount of separation does not occur. To address the foregoing and improve the resolution of the analysis, rather than using a single column, a technique has been implemented whereby at least portions of the effluent are periodically injected into a second column, whereby the second column may possess one or more different characteristics than the first column, and the effluent is detected by a detector at the end of the second column. This is generally known as multi-dimensional (or comprehensive two-dimensional) gas chromatography (GC×GC).

GC-MS/FID instruments and GC×GC-MS/FID instruments (GC and GC×GC with dual mass spectrometry (MS) and flame ionization detection (FID) as detectors) use gas chromatography to separate mixtures into individual components and mass spectrometry and flame ionization detection to identify and quantify each component, respectively.

Current flow splitters in gas chromatography (e.g., GC-MS/FID and GC×GC-MS/FID) are generally either a simple tee (passive splitter) or a flow splitter with makeup flow (active splitter). In some implementations, a flow splitter based on a Deans switch may be implemented. Depending on conditions and configurations, these splitters may not necessarily provide a constant split flow/split ratio to the FID and/or are not easy to configure or operate.

Different conditions (column flow, split ratio, etc.) generally require different restrictors (transfer lines) from the flow splitter to the detectors. Such implementations require the restrictors to be physically changed over to meet the desired conditions. Having to change the restrictors whenever a different condition is desired may be time-consuming, arduous, and inefficient. Accordingly, it may be desirable to implement a GC system that is able to satisfy a variety of different conditions without having to change the restrictors.

This section provides background information related to the present disclosure which is not necessarily prior art.

SUMMARY

One aspect of the disclosure provides an analytical instrument assembly comprising a gas chromatograph, a mass spectrometer, a flame ionization detector, and a pneumatic control module. The gas chromatograph includes a primary column configured to receive an effluent including a sample and a first portion of a carrier gas and a flow splitter coupled to the primary column and configured to receive the effluent. The mass spectrometer is coupled to the flow splitter via a first restrictor. The flame ionization detector is coupled to the flow splitter via a second restrictor. The pneumatic control module is coupled to the flow splitter and configured to deliver a second portion of the carrier gas to the flow splitter, the flow splitter being configured to split the effluent and deliver at least a first portion of the effluent to the mass spectrometer through the first restrictor and at least a second portion of the effluent to the flame ionization detector through the second restrictor at a first split ratio. The pneumatic control module is configured to deliver one of (i) a makeup flow including a third portion of the carrier gas to the flow splitter or (ii) an exhaust flow out of the flow splitter, wherein the pneumatic control module is configured to regulate the pressure within the flow splitter to thereby maintain the first split ratio at a substantially constant value.

Implementations of the disclosure may include one or more of the following features. In some implementations, the split ratio is defined as the flow to the flame ionization detector divided by the flow to the mass spectrometer at the point where the flow splitter splits the flow.

The flow splitter may be configured to maintain the first split ratio at the substantially constant value throughout the course of a temperature-programmed gas chromatography analysis.

The pneumatic control module may be configured to control an exhaust flow from the flow splitter to thereby back pressure regulate the pressure within the flow splitter.

The gas chromatograph may include a secondary column coupled to the primary column and configured to receive the effluent. The gas chromatograph may include a modulator between the primary column and the secondary column.

The regulated pressure and the second portion of the carrier gas may be configured to control the amount of the second portion of the effluent delivered to the flame ionization detector. The first portion of the effluent delivered to the mass spectrometer may be diluted with a makeup gas. The first portion of the effluent delivered to the mass spectrometer may be split with at least some of the first portion of the effluent going to exhaust.

The regulated pressure and the second portion of the carrier gas may be configured to control the amount of the first portion of the effluent delivered to the mass spectrometer.

The effluent may be configured to be delivered from the primary column to the flow splitter at a constant flow and the pneumatic control module is configured to deliver the second portion of the carrier gas to the flow splitter at a constant flow to mix the effluent with the second portion of the carrier gas and deliver the second portion of the effluent to the flame ionization detector at a constant flow throughout the course of a temperature-programmed gas chromatography analysis.

Another aspect of the disclosure provides an analytical instrument assembly that includes a gas chromatograph, a first detector, a second detector, and a pneumatic control module. The gas chromatograph includes a flow splitter configured to receive a sample. The first detector is coupled to the flow splitter. The second detector is coupled to the flow splitter. The pneumatic control module is coupled to the flow splitter and configured to deliver a carrier gas to the flow splitter. The flow splitter is configured to split the sample and deliver at least a first portion of the sample to the first detector and at least a second portion of the sample to the second detector at a first split ratio. The pneumatic control module is configured to deliver one of (i) a makeup flow including a third portion of the carrier gas to the flow splitter or (ii) an exhaust flow out of the flow splitter, wherein the pneumatic control module is configured to regulate the pressure within the flow splitter to thereby maintain the first split ratio at a substantially constant value.

Implementations of the disclosure may include one or more of the following features. In some implementations, the first detector is a mass spectrometer. The second detector may be a flame ionization detector.

The gas chromatograph may include an inlet and a primary column coupled to the inlet, the inlet configured to provide the sample and a first portion of the carrier gas to the primary column. The split ratio may be defined as the flow to the second detector divided by the flow to the first detector at the point where the flow splitter splits the flow. The gas chromatograph may include a secondary column coupled to the primary column and configured to receive the sample and a modulator between the primary column and the secondary column.

The flow splitter may be configured to maintain the first split ratio at the substantially constant value throughout the course of a temperature-programmed gas chromatography analysis.

The pneumatic control module may be configured to control an exhaust flow from the flow splitter to thereby back pressure regulate the pressure within the flow splitter.

The regulated pressure and the carrier gas may be configured to control the amount of the second portion of the sample delivered to the second detector.

The regulated pressure and the carrier gas may be configured to control the amount of the first portion of the sample delivered to the first detector.

Another aspect of the disclosure provides a flow splitter for splitting column effluent to two detectors with a constant split ratio (representative sampling) at the split point; however, for flow control reasons throughout a temperature-programmed GC separation there is dilution and/or additional splitting of the effluent streams. Overall, the splitter is configured to perform representative sampling to obtain accurate quantitation. Representative sampling means that the relative amounts of analytes in the mixture which are separated during a temperature-programmed GC separation are the same before and after splitting, i.e., a constant split ratio throughout a temperature-programmed GC separation. The first detector split portion is representative, while the split portion of the second detector may or may not be representative, depending on the type of detector. The split portion going to the second detector is representative at the split point, but for pressure and flow control reasons, the split effluent to the second detector is either diluted variably or split further variably. This variable dilution or split may make the second detector response non-representative. Whether the sampling to the second detector is representative or not depends on the detector type and its control.

Generally, the variability of the sampling to the second detector, when present, is not a large fraction of the sample amount. The system can be utilized for GC-MS/FID and GC×GC-MS/FID in which the FID provides quantitative accuracy as the first detector and the MS provides at least qualitative characterization as the second detector. The design and control of the system is configured to provide for easy installation and operation and allow variable column flows and split ratios with a single set of restrictors to the first and second detectors.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

Figure 1:
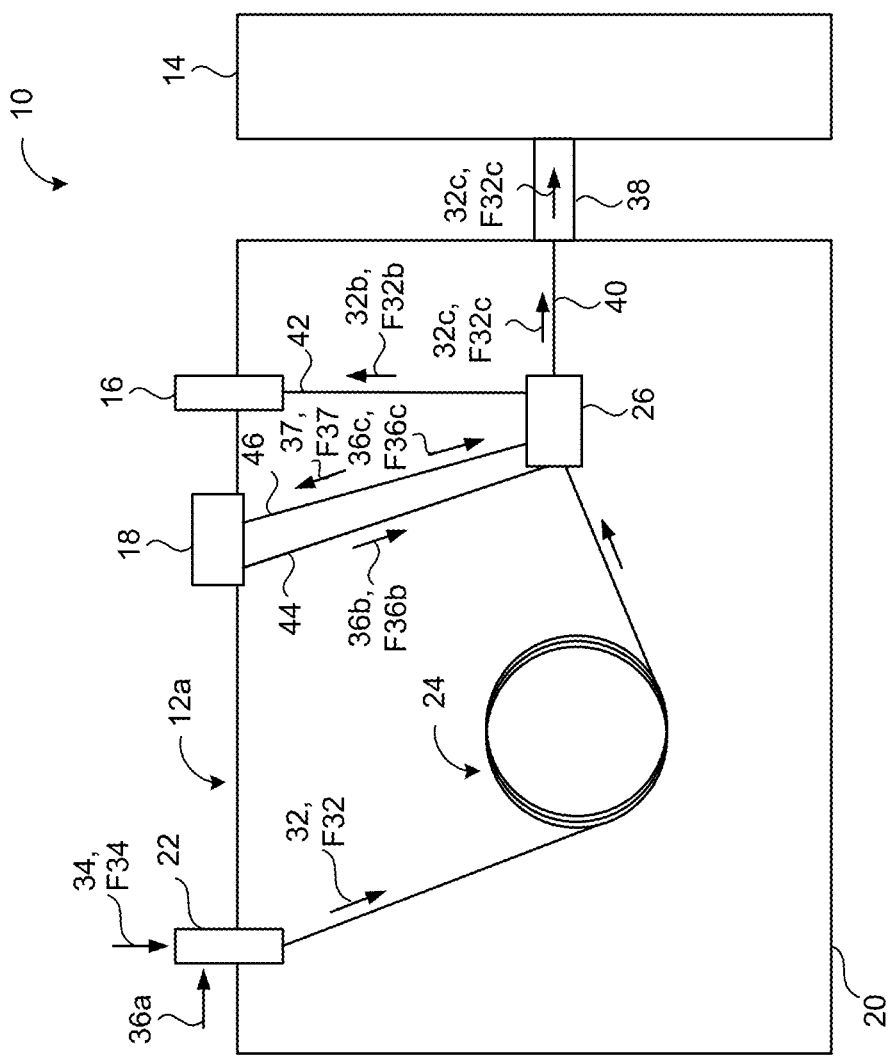
FIG. 1 is a schematic view of an exemplary GC-MS/FID system including a flow splitter in accordance with principles of the present disclosure.
Figure 2:
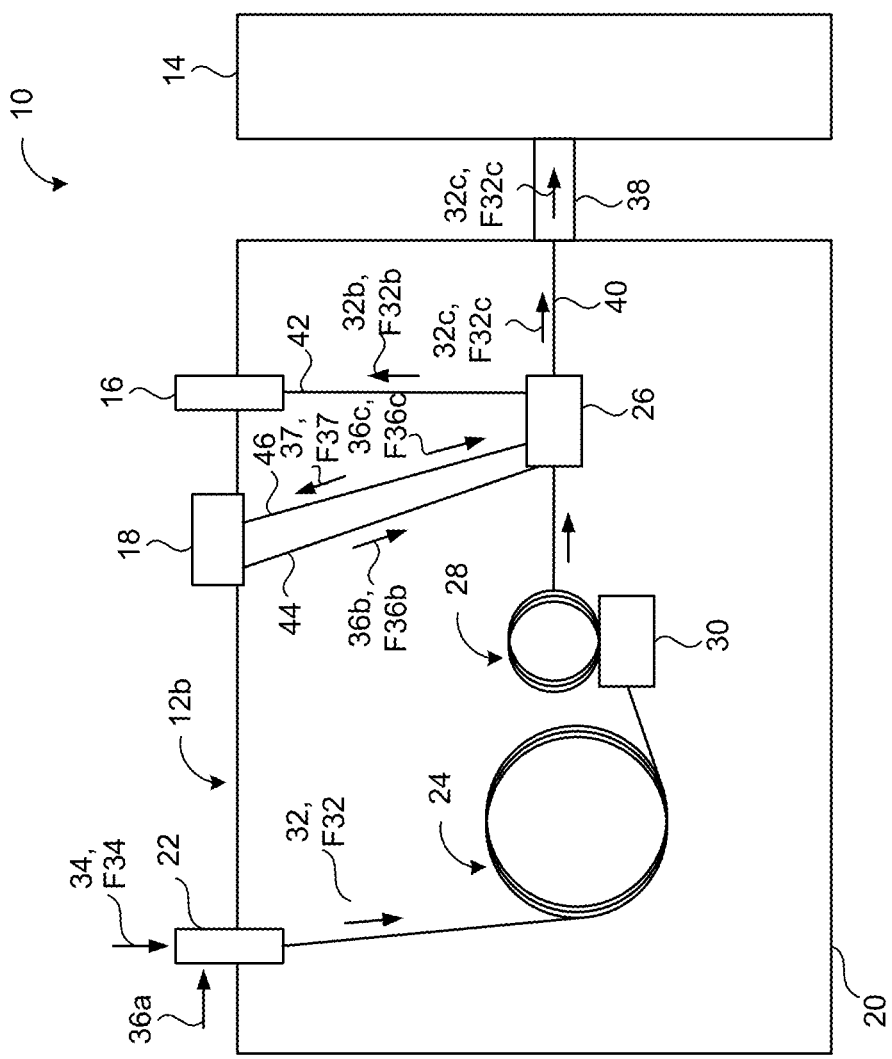
FIG. 2 is a schematic view of an exemplary GC×GC-MS/FID system including the flow splitter of FIG. 1 in accordance with principles of the present disclosure.

Referring to FIGS. 1 and 2, an analytical instrument assembly 10 is generally shown. The assembly 10 may include a gas chromatography device, which may be a gas chromatograph (GC) 12a, as shown in FIG. 1, or a comprehensive two-dimensional (multi-dimensional) gas chromatograph (GC×GC) 12b, as shown in FIG. 2. As will become apparent, the principles of the present disclosure may apply to the GC 12a, the GC×GC 12b, and/or any other suitable gas chromatography device, including, but not limited to gas-liquid chromatography (GLC), gas-solid chromatography (GSC), etc. The assembly 10 includes a first detector, i.e., a mass spectrometer (MS) 14, coupled to the gas chromatography device 12a, 12b, a second detector, i.e., a flame ionization detector (FID) 16, coupled to the gas chromatography device 12a, 12b, and a pneumatic control module (PCM) 18.

While the assembly 10 is described as including the MS 14 as the first detector and the FID 16 as the second detector, it should be understood that the first and second detectors may include any suitable detector(s), such as, a thermal conductivity detector (TCD), an alkali flame detector (AFD), a catalytic combustion detector (CCD), a discharge ionization detector (DID), a polyarc reactor, a flame photometric detector (FPD), an atomic emission detector (AED), an electron capture detector (ECD), a nitrogen-phosphorus detector (NPD), a dry electrolytic conductivity detector (DELCD), a vacuum ultraviolet (VUV), a Hall electrolytic conductivity detector (ElCD), a helium ionization detector (HID), an infrared detector (IRD), a photo-ionization detector (PID), a pulsed discharge ionization detector (PDD), a thermionic ionization detector (TID), etc. It should further be understood that any of the foregoing detectors may be arranged in any suitable combination.

With continued reference to FIGS. 1 and 2, the gas chromatography device 12a, 12b includes a main oven 20, an inlet 22, a primary column 24, and a flow splitter 26. With the exception of the GC×GC 12b including a secondary column 28 and a modulator 30, as shown in FIG. 2 and as described in more detail below, the GC 12a and the GC×GC 12b, including the components and their functionality, may be substantially similar or the same. Accordingly, it should be understood that the description below applies to both the GC 12a and the GC×GC 12b, with the exception of the secondary column 28 and the modulator 30 applying to only the GC×GC 12b.

The main oven 20 may house or receive at least the inlet 22, the primary column 24, the flow splitter 26, the secondary column 28, and the modulator 30. The inlet 22 may be configured to create an effluent 32 including a sample 34 and a first portion or stream of a carrier gas 36a (i.e., the eluent). The sample 34 may be injected into the inlet 22 via an injection device, such as, for example, a syringe, an automated injection device, or any other suitable means, and may be any suitable sample or analyte, such as, for example, petroleum, fragrances, drug-related liquids, etc. The first portion of the carrier gas 36a may be contained in a tank and may be any suitable gas, such as, for example, an inert gas such as helium, an unreactive gas such as nitrogen, etc. The first portion of the carrier gas 36a may be supplied to the inlet 22 in a constant stream and the sample 34 may be supplied to the inlet as an aliquot. The inlet 22 may mix the sample 34 and the first portion of the carrier gas 36a to form the effluent 32, and the inlet 22 may inject the effluent 32 into the primary column 24.

The primary column 24 and the secondary column 28 may each be wound in a generally circular configuration or have any suitable configuration. For the GC 12a, the primary column 24 may extend from the inlet 22 to the flow splitter 26. For the GC×GC 12b, the primary column 24 may extend from the inlet 22 to the modulator 30, and the secondary column 28 may extend from the modulator 30 to the flow splitter 26. In some implementations, the primary column 24 and the secondary column 28 may have different characteristics from each other. In one example, the primary column 24 may be longer, have a greater diameter, and/or contain a different stationary phase than the secondary column 28. In another example, the primary column 24 may have a smaller diameter than the secondary column 28.

For the GC×GC 12b, the modulator 30 may be configured to receive the effluent 32 from the primary column 24 and perform modulation on the effluent 32 over a period of time referred to as a modulation period. The modulation process may include at least the steps of sampling the effluent 32 and injecting all or a portion of the effluent 32 into the secondary column 28. In some implementations, the modulation process includes an additional step of focusing the eluite 34 prior to injecting the eluite 34 into the secondary column 28. The modulation period is the time it takes for the modulator 30 to complete the modulation process, including the aforementioned steps.

The MS 14 may be coupled to the gas chromatography device 12a, 12b via a transfer line 38. The MS 14 and the FID 16 may each be configured to receive an eluate, including the sample 34, and detect or collect a plurality of data about the sample 34, including, for example, retention time, signal (or intensity), etc. While the MS 14 and FID 16 are described herein, it should be understood that any suitable detectors may be implemented, including, but not limited to, an electron capture detector (ECD), an atomic emission detector (AED), a sulfur chemiluminescence detector (SCD), a nitrogen chemiluminescence detector (NCD), a nitrogen phosphorous detector (NPD), etc.

A computing device may be in communication with the MS 14 and the FID 16 and may receive, analyze, and/or process data about the sample 34 from the MS 14 and the FID 16. The computing device may be any suitable device, such as, for example, a computer, a laptop, a tablet, a smartphone, etc. The computing device may process the data about the sample 34 and output a chromatogram. The computing device may be used to program or control any suitable components of the assembly 10, including the PCM 18, the modulator 30, etc.

Referring to FIGS. 1-3E, the MS 14 may be coupled to the flow splitter 26 via a mass spectrometer (MS) restrictor 40 extending to or through the transfer line 38. The FID 16 may be coupled to the flow splitter 26 via a flame ionization detector (FID) restrictor 42. The PCM 18 may be coupled to the flow splitter 26 via a flow control capillary 44 and a makeup/exhaust flow capillary 46. The MS restrictor 40 is configured to receive a first portion of the eluate 32a and deliver the first portion of the eluate 32a to the MS 14. The FID restrictor 42 is configured to receive a second portion of the eluate 32b and deliver the second portion of the eluate 32b to the FID 16. The flow control capillary 44 is configured to deliver a second portion of the carrier gas 36b to the flow splitter 26 and the makeup/exhaust flow capillary 46 is configured to deliver a third portion (or makeup flow) of the carrier gas 36c to the flow splitter 26 or exhaust flow 37 from the flow splitter 26. As shown in the figures, a flow of the effluent 32, including the sample 34 and the portions of the carrier gas 36a-36c, are generally represented by FX, for example, a flow of the sample 34 is represented by F34.

Figure 3A:
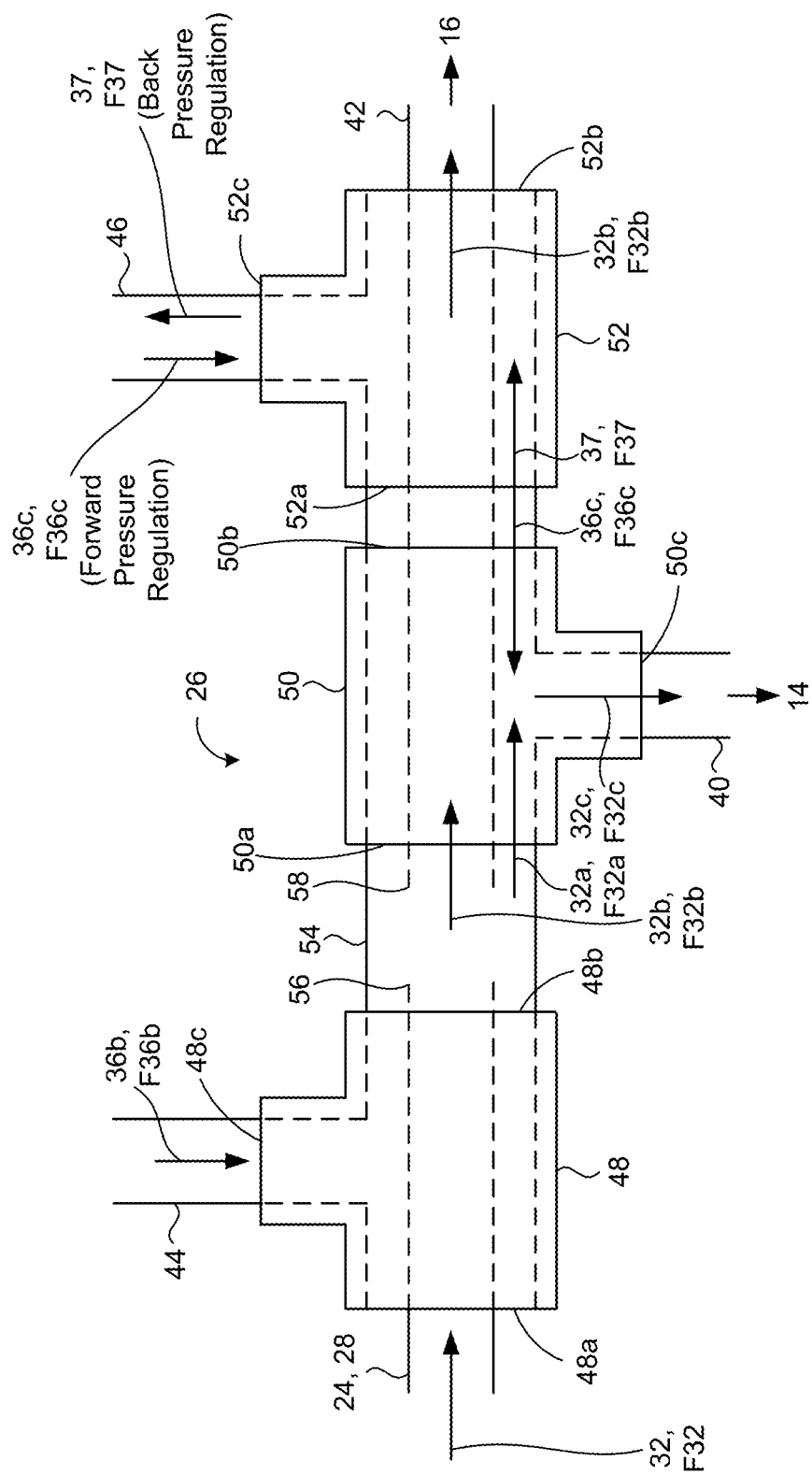
FIG. 3A is a schematic view of a first exemplary flow splitter of FIG. 1.

Referring to FIGS. 3A and 4-6, the flow splitter 26 may include a first tee 48, a second tee 50, a third tee 52, and one or more connecting tubes 54 connecting the first tee 48 to the second tee 50 and the second tee 50 to the third tee 52. In some implementations, the connecting tube 54 may be a single component extending from the first tee 48, through the second tee 50, and to the third tee 52 with appropriate apertures to facilitate flow of the eluate 32 and eluent 36. While three tees 48, 50, 52 are shown in FIG. 3A, it should be understood that the tees 48, 50, 52 may be combined or consolidated in any suitable manner. For example, as shown in FIG. 3C, the second tee 50 and the third tee 52 may be combined into a single fitting. Similarly, as shown in FIG. 3D, the second tee 50 and the third tee 52 may be combined into a single fitting 50 that is generally cross-shaped. As yet another example, as shown in FIG. 3E, the tees 48, 50, 52 may all be combined with each other to form a single fitting. While not illustrated in the figures, it should be understood that the first tee 48 and the second tee 50 may similarly be combined into a single fitting. The configurations shown in FIGS. 3A-3E may have the benefit of reduced dead volume and, thus, better chromatographic peak shapes.

Figure 3B:
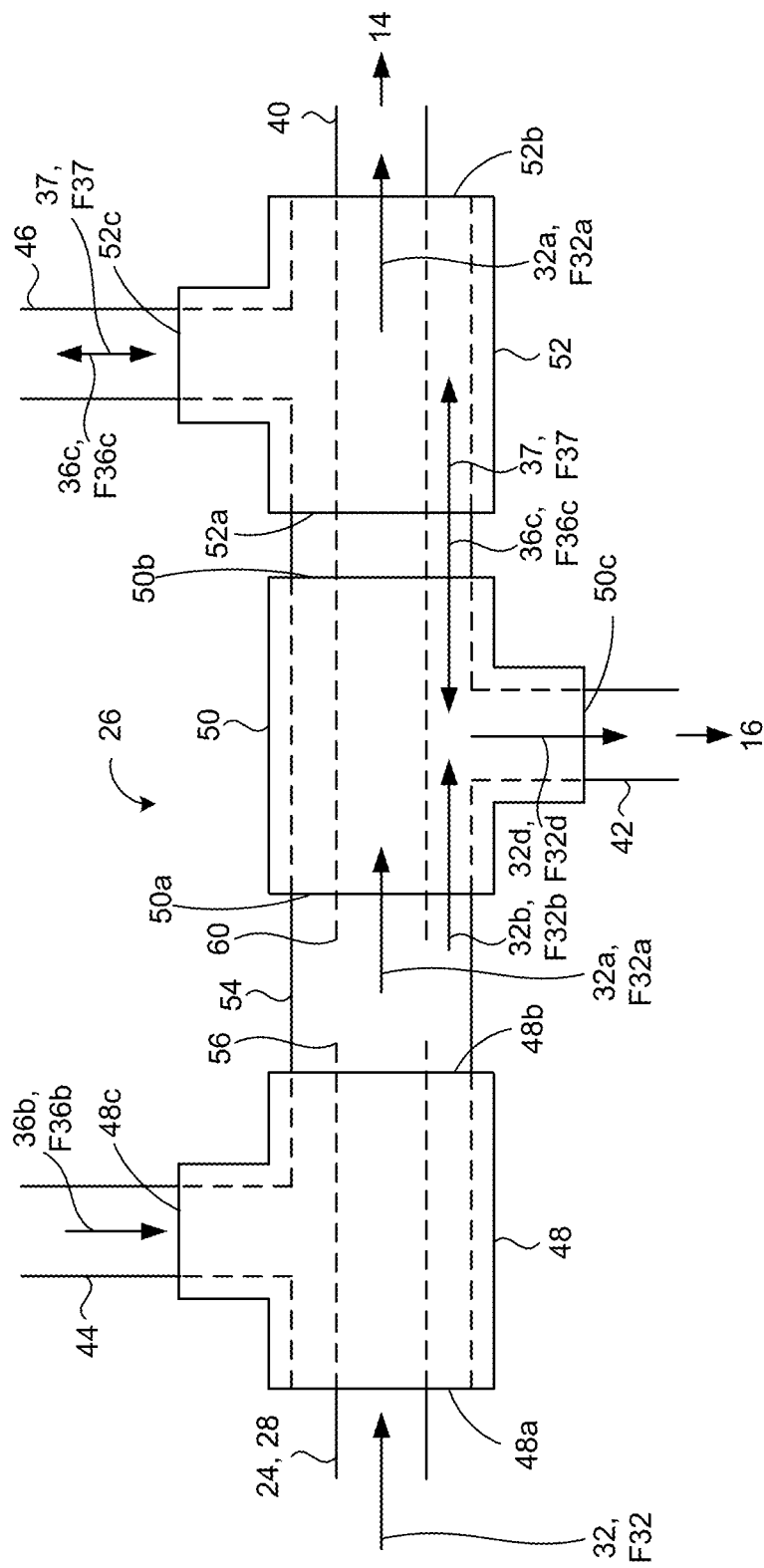
FIG. 3B is a schematic view of a second exemplary flow splitter of FIG. 1.
Figure 3C:
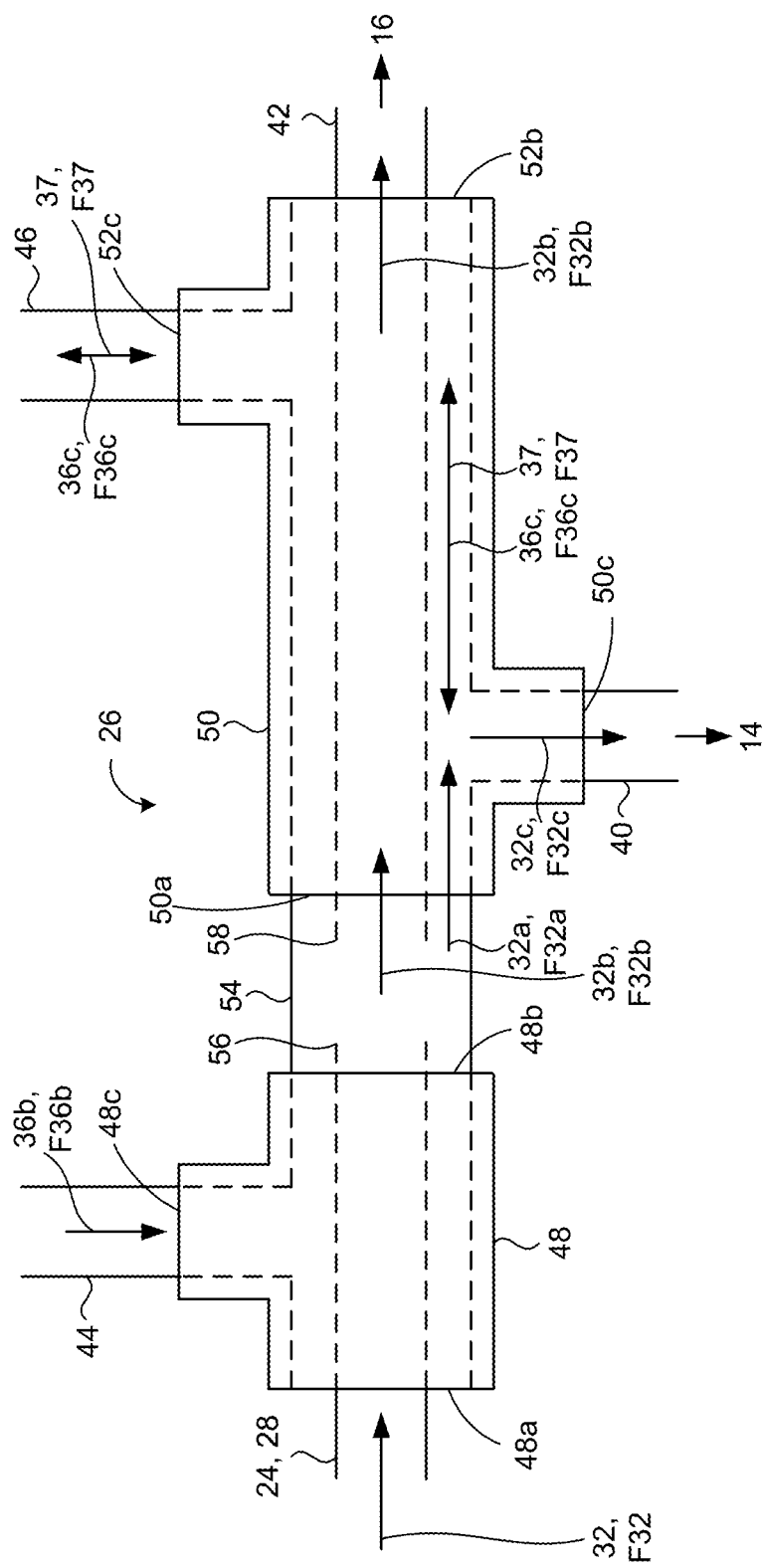
FIG. 3C is a schematic view of a third exemplary flow splitter of FIG. 1.
Figure 3D:
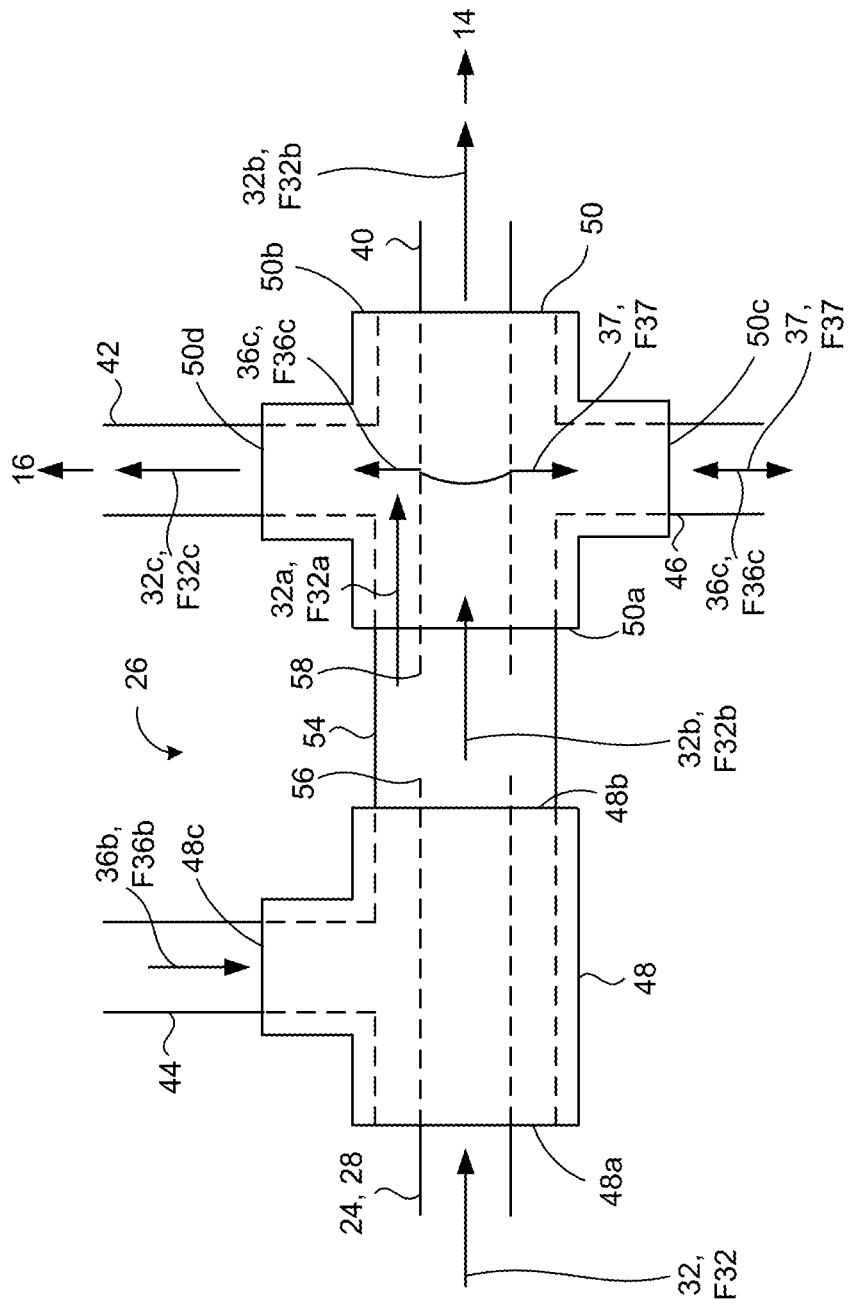
FIG. 3D is a schematic view of a fourth exemplary flow splitter of FIG. 1.
Figure 3E:
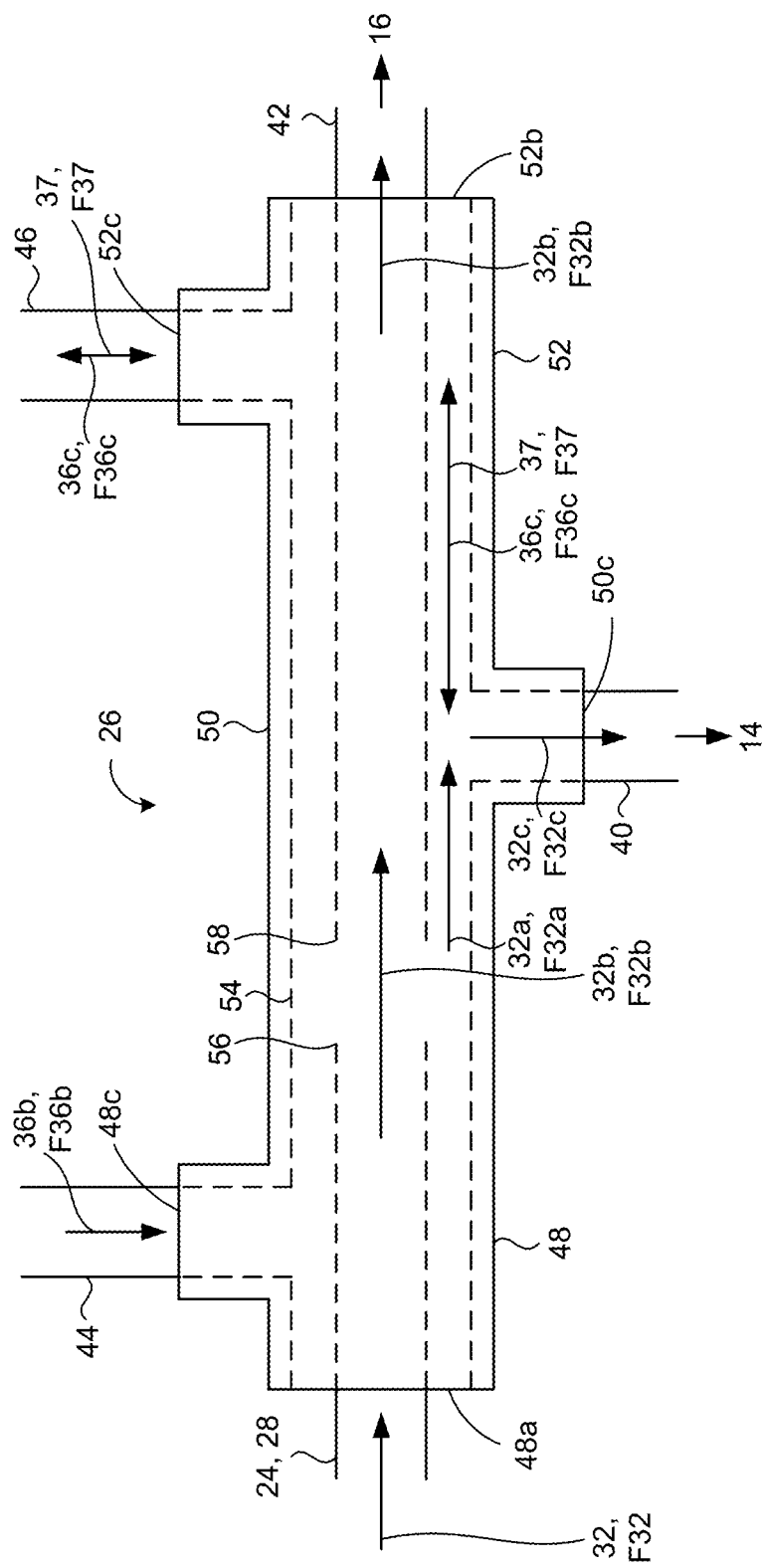
FIG. 3E is a schematic view of a fifth exemplary flow splitter of FIG. 1.

Referring to FIG. 3B, for each of the fitting configurations, the positions of the first detector 14 and the second detector 16 may not be equivalent with respect to the quantitative response of each detector relative to the non-split response of the detector depending on the type of detector (flux sensitive, concentration sensitive, or other). At the first detector 14 position, the diluted eluate or column flow F32 is split directly to the first detector restrictor 40 and the flow to the first detector 14 is constant when the column flow F32 is constant, the flow F36b of the second portion of the carrier gas 36b is constant, and the pressure is controlled (programmed) appropriately over the course of the chromatographic separation. At this position (first detector 14), most any GC detector will respond quantitatively the same as in the single detector case with a reduced response consistent with the split ratio and dilution of the column flow F32.

At the second detector 16 position, the flow split to the second detector 16 is also constant at the split point (i.e., the tip of the first detector restrictor 40); however, in forward pressure regulation the split flow is diluted with the makeup flow $F_{36c}$ before entering the second detector restrictor 42, and in back pressure regulation the split flow of the second detector 16 is split again before entering the second detector restrictor 42 and the remainder of the flow split to the second detector 16 goes to exhaust $F_{37}$. In both cases of pressure regulation, the flow to the second detector 16 varies somewhat (up to approximately (+/−5%) 20% depending on conditions and restrictors) over the course of the temperature-programmed GC separation as the pressure is controlled to provide the appropriate pressure for the desired flows which maintain a constant split ratio at the split point throughout the chromatographic separation.

Unlike the first detector 14, the response of second detector 16 relative to its response as a single detector will depend on the type of GC detector and whether the splitter is in forward pressure or back pressure regulation. Because of either dilution (forward pressure regulation) or a further split (back pressure regulation), the quantitative response of the second detector 16 may not be consistent relative to the non-split response, i.e., the second detector 16 quantitative response may vary over the course of the chromatographic separation relative to the non-split case. For example, if the second detector 16 is an FID (flux sensitive), back pressure regulation variably exhausts some of the split sample, and, thus, the response of the FID 16 would not be consistent with the non-split case. However, in the forward pressure regulation case, the sample is diluted, but the total split sample is transferred to the FID 16, so the response of the FID 16 would be the same as long as the other flows of the FID 16 (i.e., fuel, makeup air) are controlled appropriately. In the case in which the second detector 16 is a GC detector sensitive to concentration, it would be expected that, in back pressure regulation, the concentration would be unchanged, and the response would be essentially the same as in the non-split case.

Referring to FIG. 3A, the first tee 48 may include a first opening 48a, a second opening 48b opposite the first opening 48a, and a middle opening 48c between the first opening 48a and the second opening 48b. Similarly, the second tee 50 may include a first opening 50a, a second opening 50b opposite the first opening 50a, and a middle opening 50c between the first opening 50a and the second opening 50b. Similarly, the third tee 52 may include a first opening 52a, a second opening 52b opposite the first opening 52a, and a middle opening 52c between the first opening 52a and the second opening 52b. Alternatively, the tees 48, 50, 52 may have any suitable configuration. For example, as shown in FIG. 3D, the fitting 50 may include a third opening 50c and a fourth opening 50d. One of the connecting tubes 54 may extend from the second opening 48b of the first tee 48 to the first opening 50a of the second tee 50, and the other of the connecting tubes 54 may extend from the second opening 50b of the second tee 50 to the first opening 52a of the third tee 52.

Figure 6:
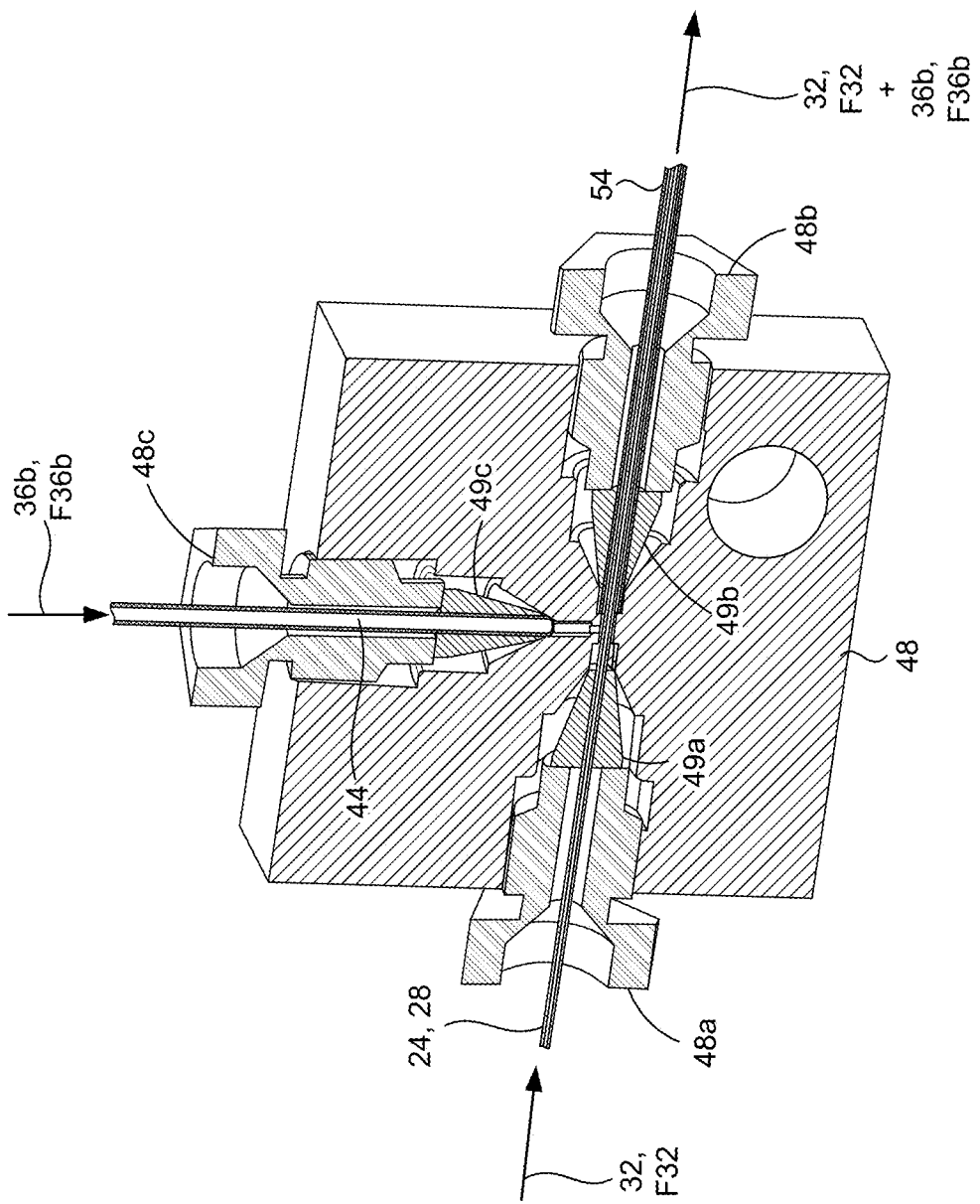
FIG. 6 is a cross-sectional view of a first tee of the flow splitter of FIG. 5.
Figure 7:
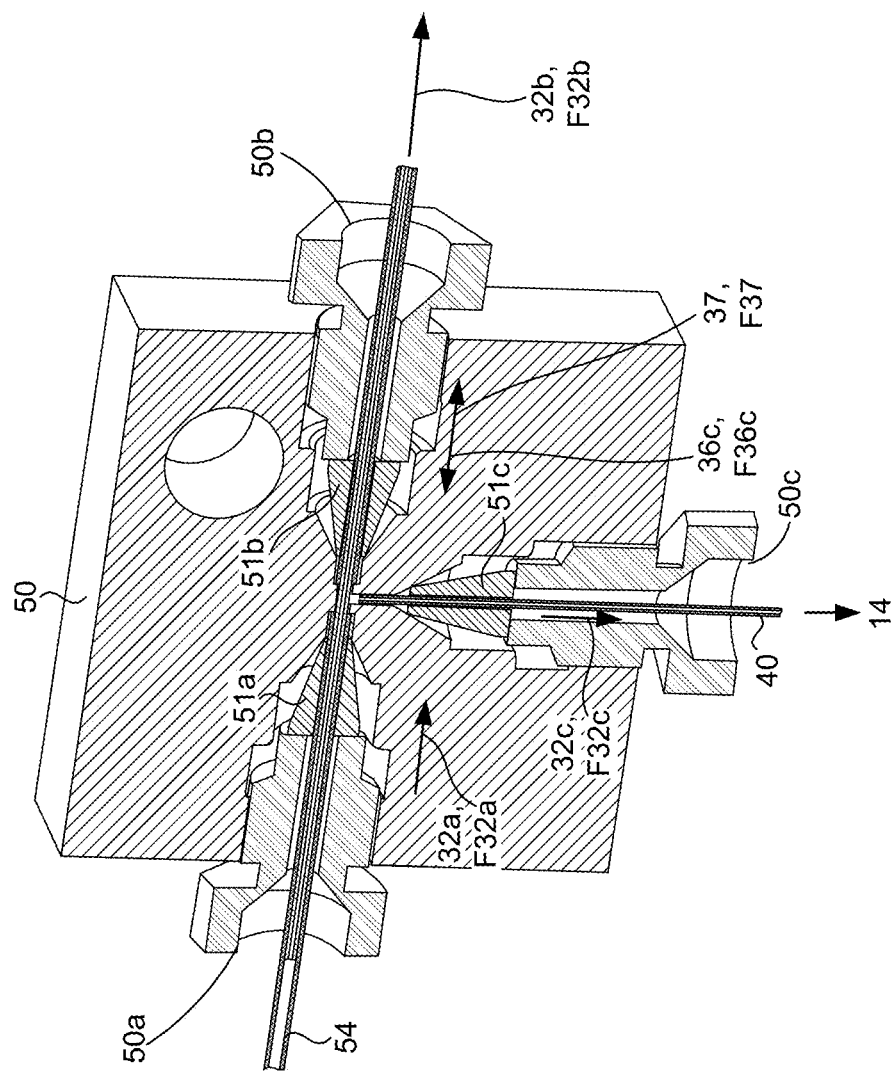
FIG. 7 is a cross-sectional view of a second tee of the flow splitter of FIG. 5.
Figure 8:
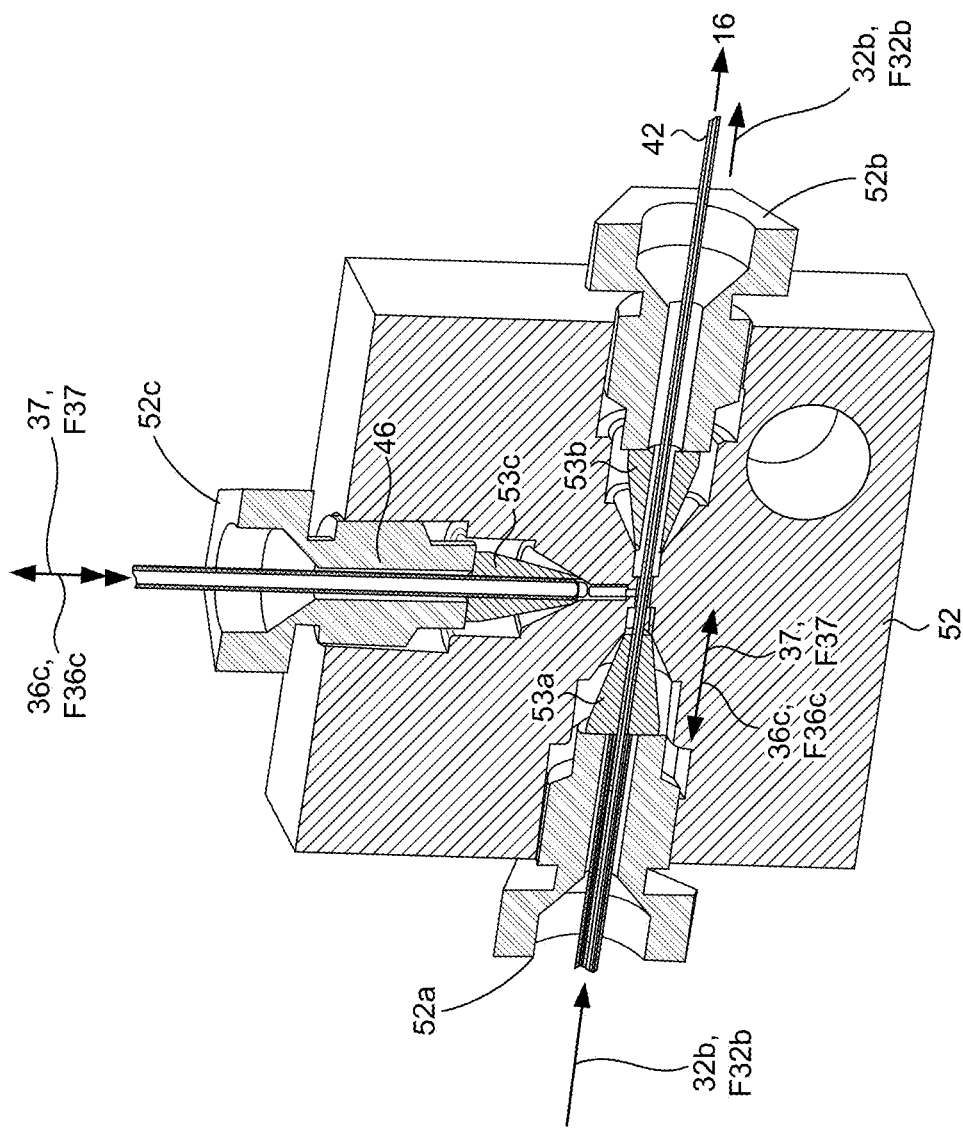
FIG. 8 is a cross-sectional view of a third tee of the flow splitter of FIG. 5.

Referring to FIG. 6, the first tee 48 may include a first compression fitting 49a at or near the first opening 48a, a second compression fitting 49b at or near the second opening 48b, and a third compression fitting 49c at or near the third opening 48c. Referring to FIG. 7, the second tee 50 may include a first compression fitting 51a at or near the first opening 50a, a second compression fitting 51b at or near the second opening 50b, and a third compression fitting 51c at or near the third opening 50c. Referring to FIG. 8, the third tee 52 may include a first compression fitting 53a at or near the first opening 52a, a second compression fitting 53b at or near the second opening 52b, and a third compression fitting 53c at or near the third opening 52c.

Referring to FIG. 3A, the first opening 48a of the first tee 48 may receive the primary column 24 for the GC 12a (or the secondary column 28 for the GC×GC 12b), and the column 24, 28 may extend through the first opening 48a and the second opening 48b and terminate at a tip 56 beyond the second opening 48b in the connecting tube 54. The middle opening 48c of the first tee 48 may receive the flow control capillary 44 of the PCM 18. The first compression fitting 49a may cause the first opening 48a to be sufficiently sealed such that the second portion of the carrier gas 36b may only flow left to right as shown in FIG. 6. Specifically, the second portion of the carrier gas 36b may flow around the outside of the column in the annulus between the column (inside) and the connecting tube 54 (outside).

The FID restrictor 42 may extend through the second opening 52b of the third tee 52, through the first opening 52a of the third tee 52, through the second opening 50b of the second tee 50, through the first opening 50a of the second tee 50, and may terminate at a tip 58 in the connecting tube 54 downstream from the column 24, 28. The middle opening 50c of the second tee 50 may receive the MS restrictor 40 and the middle opening 52c of the third tee 52 may receive the makeup/exhaust flow capillary 46 of the PCM 18.

As another example, as shown in FIG. 3B, the MS restrictor 40 may extend through the second opening 52b of the third tee 52, through the first opening 52a of the third tee 52, through the second opening 50b of the second tee 50, through the first opening 50a of the second tee 50, and may terminate at a tip 60 in the connecting tube 54 downstream from the column 24, 28, and the middle opening 50c of the second tee 50 may receive the FID restrictor 42.

Referring to FIG. 3A, the flow control capillary 44 of the PCM 18 delivers a constant flow F36b of the second portion of the carrier gas 36b as specified by the PCM 18. The flow F36b of the second portion of the carrier gas 36b passes through the first tee 48 and through the annulus around the column 24, 28. The eluate or column flow F32 from the column 24, 28 and the flow F36b of the second portion of the carrier gas 36b mix within the connecting tube 54 before reaching the tip 58 of the FID restrictor 42. The length of the connecting tube 54 between the first tee 48 and the second tee 50 may be sufficiently long for the flows F32, F36b to mix.

With continued reference to FIG. 3A, a split point of the eluate flow F32 is at or near the tip 58 of the FID restrictor 42 between the first tee 48 and the second tee 50 in the connecting tube 54. The eluate 32 is split at the split point with the second portion of the eluate 32b being delivered to the FID restrictor 42 and the FID 16 and the remainder of the eluate 32, i.e., the first portion of the eluate 32a, flowing around the FID restrictor 42, through the middle tee 50 where it is mixed with the makeup flow F36c of the carrier gas 36c to form a third portion of the eluate 32c. In the case of back pressure regulation, the eluate 32a is split with a portion going to exhaust flow F37 and a portion to the MS restrictor 40 as the third portion of the eluate 32c. The flow F32c of the third portion of the eluate 32c is sent to the MS restrictor 40 and the MS 14. The second compression fitting 53b may cause the second opening 52b to be sufficiently sealed such that the third portion of the carrier gas 36c may only flow right to left as shown in FIG. 8. Specifically, the third portion of the carrier gas 36c may flow around the outside of the column in the annulus between the column (inside) and the connecting tube 54 (outside). Because the sample 34 passes over the outside of the FID restrictor 42, the FID restrictor 42 may be formed of a metal capillary coated with an inert material on both the inside and outside to minimize adsorption.

The makeup/exhaust flow capillary 46 of the PCM 18 may regulate the pressure within the connecting tube 54 with the makeup flow F36c flowing into the flow splitter 26. The desired pressure may be programmed on the PCM 18. This pressure may be the inlet pressure into the FID restrictor 42 and may define the flow in the FID restrictor 42 based on the inlet pressure, the outlet pressure (atmospheric pressure or any other suitable pressure), the FID restrictor 42 dimensions, and the temperature zones of the FID restrictor 42. This controlled pressure within the flow splitter 26 may also define the outlet pressure of the column 24, 28 which may allow the inlet pressure of the column 24, 28 to be programmed for constant effluent flow F32 from the column 24, 28. With a constant eluate flow F32 from the column 24, 28 going into the flow splitter 26 and a constant flow F36b of the second portion of the carrier gas 36b mixing with the eluate flow F32, a constant flow F34 of the sample 34 to the tip 58 of the FID restrictor 42 may be provided.

In some implementations, the PCM 18 may regulate the pressure within the connecting tube 54 with the exhaust flow F37 flowing out of the flow splitter 26, as indicated by the arrow of flow F37 in FIG. 3A flowing out of the flow splitter 26. In such implementations, the pressure regulation is back pressure instead of forward pressure regulation, and the flow F32a of the first portion of the eluate 32a splits part to the flow F32c of the third portion of the eluate 32c and the other split part is exhaust flow F37.

The constant flow F34 of the sample 34 may be split to a constant flow F34a of a first portion of the sample 34a into the FID restrictor 42 and a constant flow F34b of a second portion of the sample 34b around the outside of the FID restrictor 42. In this process the sample flow F34 from the column 24, 28 is diluted by the flow F36b of the second portion of the carrier gas 36b, but, in some implementations, the FID 16 is a flux-based detector, so the response of the FID 16 may be the same as for an undiluted sample. The makeup flow F36c may be adjusted accordingly based on the flow F36b of the second portion of the carrier gas 36b. In some configurations, the flow F32a of the first portion of the eluate 32a at the split point (the tip 58 of the FID restrictor 42) may also be constant.

By controlling the makeup flow $F_{36e}$ or exhaust flow $F_{37}$ and PCM pressure regulation, the PCM 18 may be able to vary the column flow and the split ratio with the same set of restrictors (i.e., the MS restrictor 40 and the FID restrictor 42) for the MS 14 and the FID 16. This simplifies the use of the flow splitter 26 by reducing or eliminating the need to change restrictors for various conditions. Additionally, by controlling the pressure in the flow splitter 26, the PCM 18 may appropriately control the inlet pressure to the restrictors and the outlet pressure of the column to maintain a constant split ratio throughout the course of the temperature-programmed GC analysis. In some implementations, the split ratio may be defined as the flow to the FID 16 divided by the flow to the MS 14 at the point where the flow splitter 26 splits the flow. The regulated pressure and makeup flow $F_{36c}$ or exhaust flow $F_{37}$ are configured to provide varying split ratios at varying column flows and temperatures with the same MS restrictor 40 and FID restrictor 42 and reasonably low regulated pressures.

In one implementation, the eluate flow F32 may flow between 0.5 and 20 mL/min, the flow F36b of the second portion of the carrier gas 36b may flow between 1 to 20 mL/min, the makeup flow F36c of the carrier gas 36c may flow between 0.1 to 0.3 mL/min with a forward pressure of 1 to 5 psig, and the flow F32c of the third portion of the eluate 32c may flow between 1 and 1.5 mL/min.

Referring to FIG. 3B, the operation of the flow splitter 26 may operate substantially similar to that shown in FIG. 3A, but the regulated pressure from the makeup flow F36c may control the split of the eluate 32 by controlling the flow F32a of the first portion of the eluate 32a in the MS restrictor 40 and the remainder of the eluate 32, i.e., the flow F32b of the second portion of the eluate 32b, may mix with the makeup flow F36c of the carrier gas 36c to form a fourth portion of the eluate 32d. The fourth portion of the eluate 32d may be sent to the FID 16. In this configuration, the makeup flow F36c may vary during the course of the temperature-programmed separation, which when added to the flow F32b of the second portion of the eluate 32b, may vary the combined flow F32b of the second portion of the eluate 32b and the makeup flow F36c to the FID 16. In some implementations, the makeup flow (when helium carrier gas) or fuel gas (when hydrogen carrier gas) that is part of the FID 16 and not the splitter 26 may be programmed to maintain an overall constant flow (FID makeup flow or fuel flow plus flow to the FID from the splitter) to the FID 16.

Figure 3F:
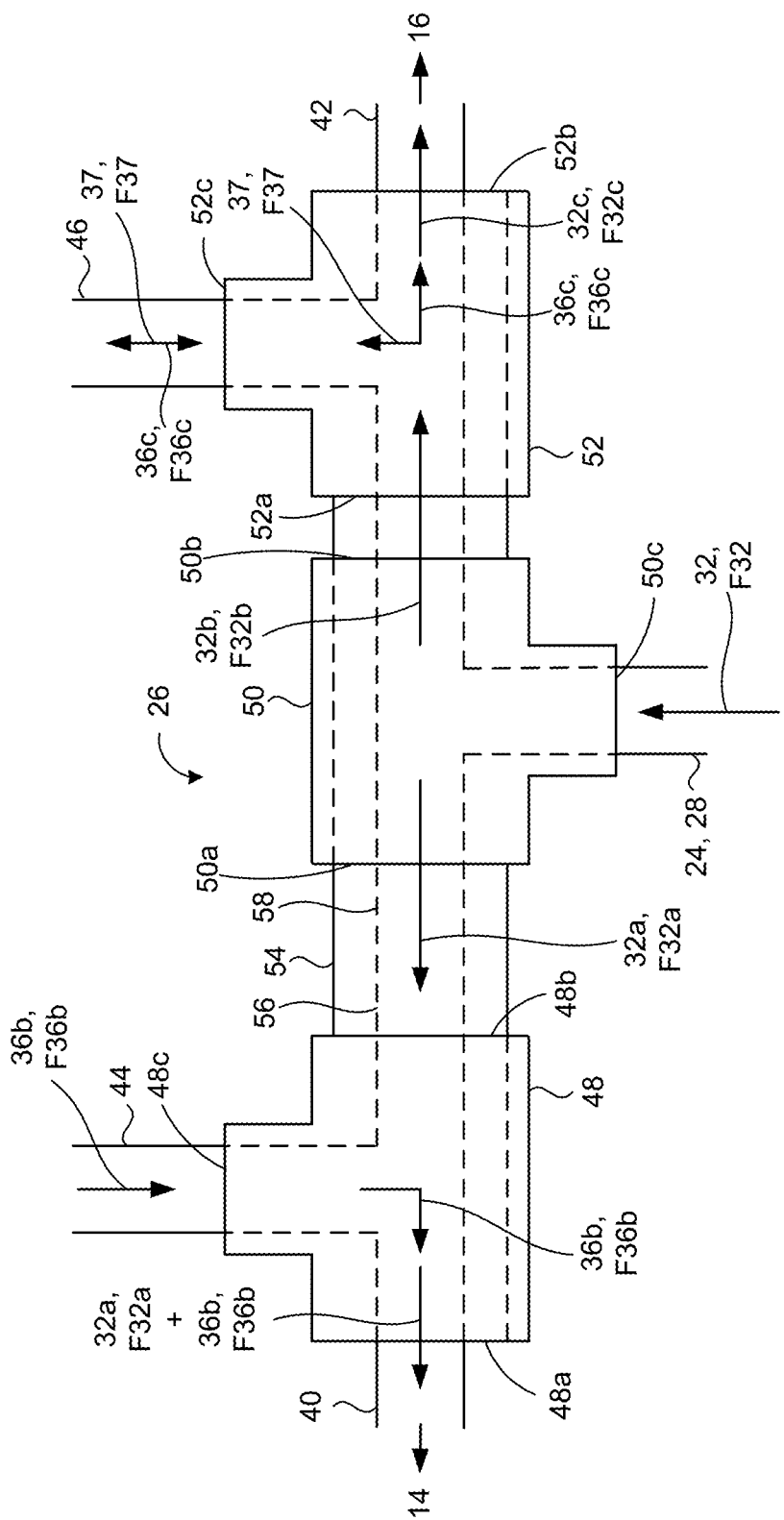
FIG. 3F is a schematic view of a sixth exemplary flow splitter of FIG. 1.
Figure 4:
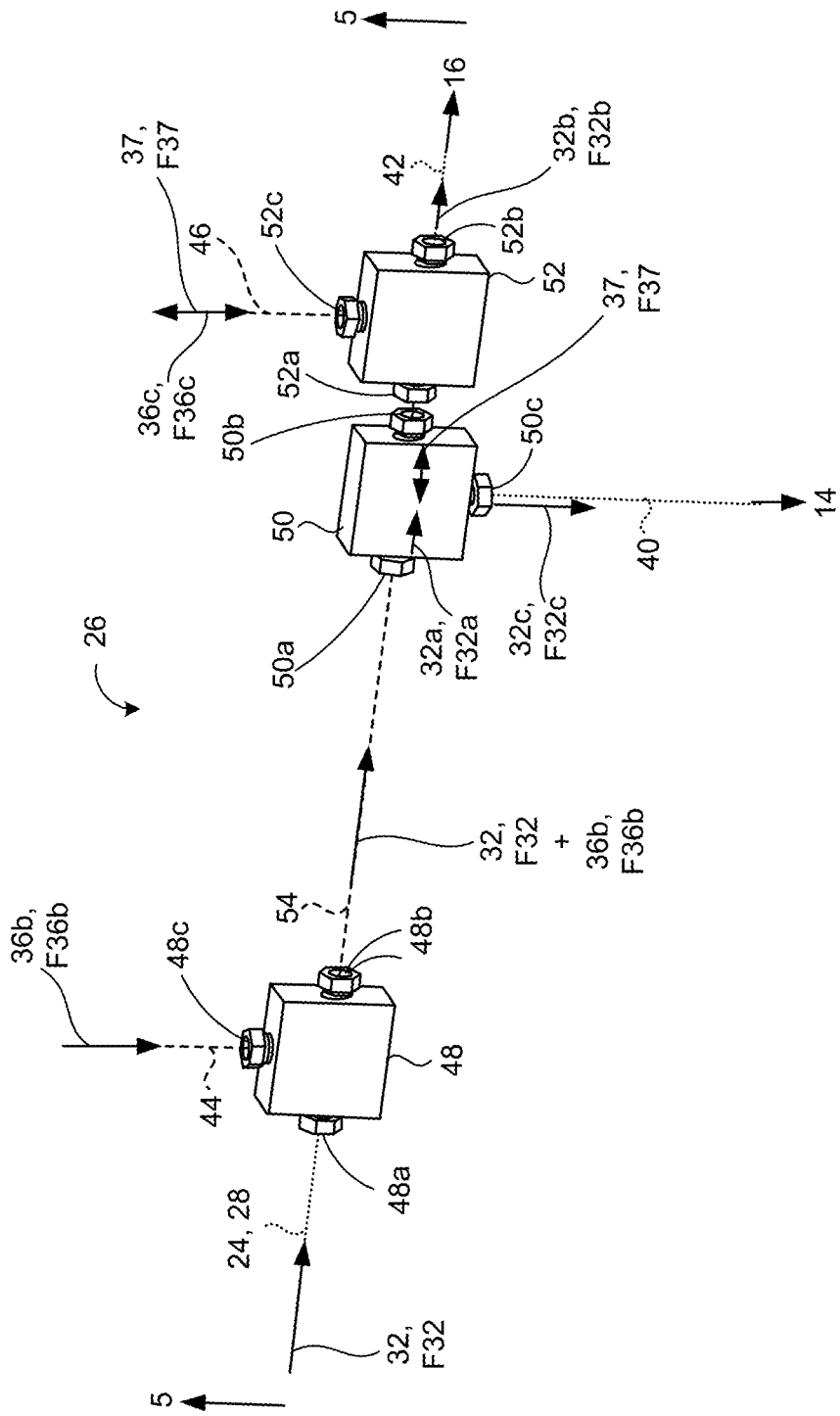
FIG. 4 is a perspective view of the flow splitter of FIG. 1.
Figure 5:
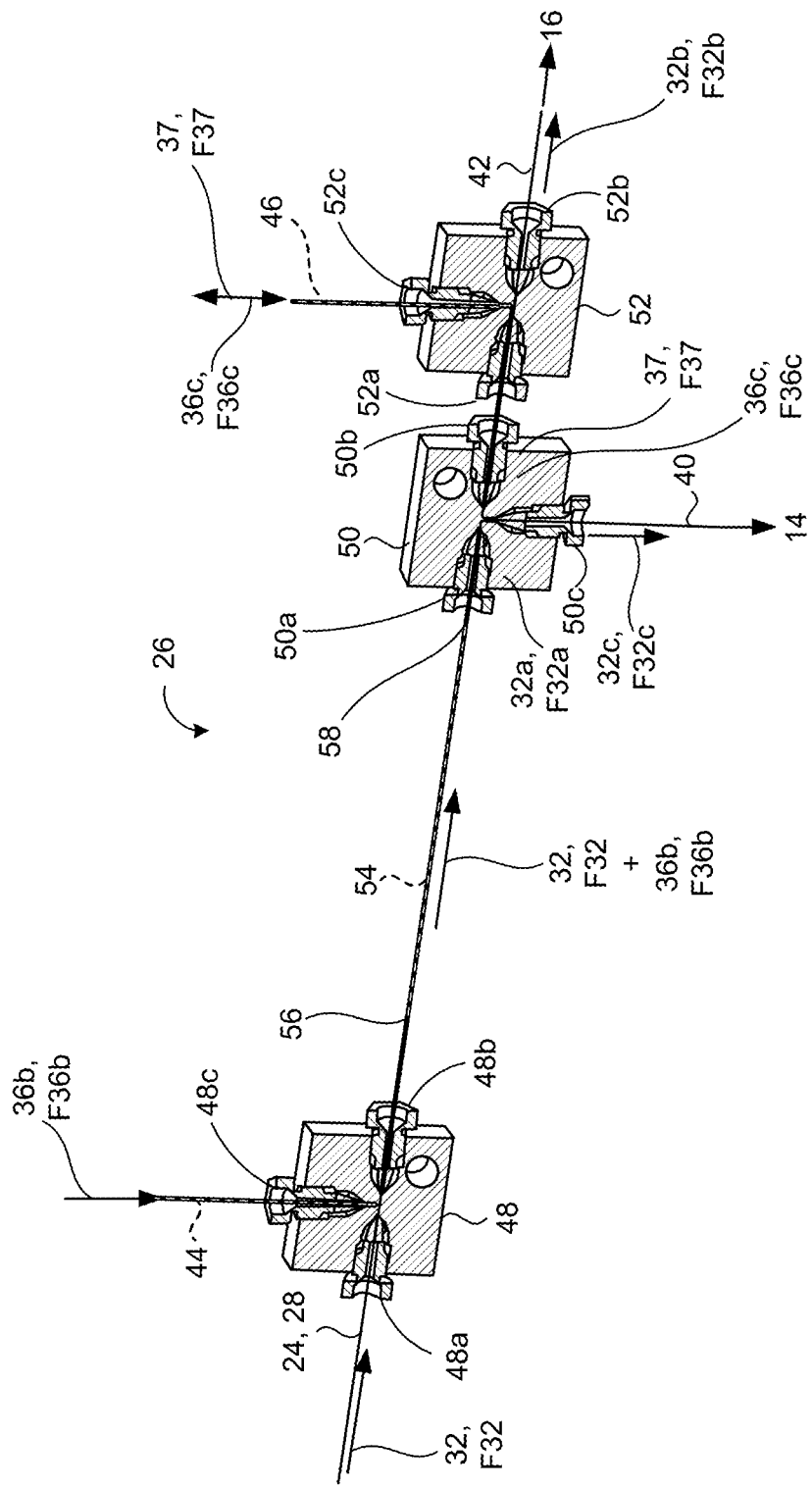
FIG. 5 is a cross-sectional view of the flow splitter of FIG. 1, taken along line 5-5 in FIG. 4.

Referring to FIG. 3F, this configuration may be similar to a Dean's switch configuration described as a splitter. The main difference is the control of flow and pressure. The split is controlled with an incoming constant flow and pressure regulation (forward or back). The resulting splitter has some of the same properties as the configurations in FIGS. 3A-3E, but the performance is different in some ways. Depending on the types of detectors being split to, one configuration may be preferred over the other. The configuration in FIG. 3F may also be configured with fittings with the column and detector restrictor inserted through the fittings. Such connections may have the benefit of reduced dead volume and thus better chromatographic peak shapes. The reduced dead volumes may be especially beneficial for the narrow chromatographic peaks of GC×GC.

In the described configurations above, the incoming flow $F_{36b}$ of the second portion of the carrier gas $36b$ makes the first detector restrictor 40 a variable restrictor. By controlling the flow $F_{36b}$ of the second portion of the carrier gas $36b$ and PCM pressure regulation, the column flow $F_{32}$ and split ratio can be varied with the same set of restrictors for the first and second detectors. This simplifies the use of the splitter by reducing or eliminating the need to change restrictors for various conditions. Additionally, by controlling the pressure in the splitter, the inlet pressure to the restrictors and the outlet pressure of the column is controlled appropriately to maintain a constant split ratio.

Because of the large difference in sensitivity between the MS and FID, the split flow from the column can be quite small making control of such a small flow difficult. The invention dilutes the sample so that the split flow to the MS is greater and more easily controlled, while the dilution of the sample doesn't impact the sensitivity of the FID because the FID is a flux sensitive detector.

In addition to the foregoing, the systems and methods described herein may provide for the following advantages: (i) constant split ratio to the FID throughout the chromatographic separation; (ii) single pair of restrictors (to MS and FID) is sufficient for a range of operating conditions (column flow, split ratio), and calculation and changing of restrictors isn't required like some other flow modulators; (iii) required operator inputs are only basic chromatographic parameters (column flow, split ratio, temperature conditions, column dimensions); (iv) operating pressure at the flow splitter is near atmospheric (~1 to 5 psig) over a range of column flows and split ratios allowing the fastest possible chromatography upstream of the flow splitter; (v) the column flow and FID split flow are operated in constant flow mode; (vi) MS and FID peak retention times can be aligned by a simple constant offset and proportional factor; and (vii) the tips of the column and restrictors and flows are configured such that dead volumes are minimized.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

A number of implementations have been described. Nevertheless, it will be understood that various modifications may be made without departing from the spirit and scope of the disclosure. Accordingly, other implementations are within the scope of the following claims.

What is claimed is:

1. An analytical instrument assembly comprising:
   a gas chromatograph including:
      a primary column configured to receive a sample mixture including a sample and a first portion of a carrier gas; and
      a flow splitter coupled to the primary column and configured to receive an eluate;
   a mass spectrometer coupled to the flow splitter via a first restrictor;
   a flame ionization detector coupled to the flow splitter via a second restrictor; and
   a pneumatic control module coupled to the flow splitter and configured to:
      deliver a second portion of the carrier gas to the flow splitter, the flow splitter being configured to split the eluate and deliver at least a first portion of the eluate to the mass spectrometer through the first restrictor and at least a second portion of the eluate to the flame ionization detector through the second restrictor at a first split ratio; and
      deliver one of (i) a makeup flow including a third portion of the carrier gas to the flow splitter or (ii) an exhaust flow out of the flow splitter, wherein the pneumatic control module is configured to regulate the pressure within the flow splitter to thereby maintain the first split ratio.

2. The analytical instrument assembly of claim 1, wherein the split ratio is defined as the flow to the flame ionization detector divided by the flow to the mass spectrometer at the point where the flow splitter splits the flow.

3. The analytical instrument assembly of claim 1, wherein the flow splitter is configured to maintain the first split ratio throughout the course of a temperature-programmed gas chromatography analysis.

4. The analytical instrument assembly of claim 1, wherein the pneumatic control module is configured to control an exhaust flow from the flow splitter to thereby back pressure regulate the pressure within the flow splitter.

5. The analytical instrument assembly of claim 1, wherein the gas chromatograph includes a secondary column coupled to the primary column and configured to receive the eluate.

6. The analytical instrument assembly of claim 5, wherein the gas chromatograph includes a modulator between the primary column and the secondary column.

7. The analytical instrument assembly of claim 1, wherein the regulated pressure and the second portion of the carrier gas are configured to control the amount of the second portion of the eluate delivered to the flame ionization detector.

8. The analytical instrument assembly of claim 7, wherein the first portion of the eluate delivered to the mass spectrometer is diluted with a makeup gas.

9. The analytical instrument assembly of claim 1, wherein the regulated pressure and the second portion of the carrier gas are configured to control the amount of the first portion of the eluate delivered to the mass spectrometer.

10. The analytical instrument assembly of claim 1, wherein the eluate is configured to be delivered from the primary column to the flow splitter at a constant flow and the pneumatic control module is configured to deliver the second portion of the carrier gas to the flow splitter at a constant flow to mix the eluate with the second portion of the carrier gas and deliver the second portion of the eluate to the flame ionization detector at a constant flow throughout the course of a temperature-programmed gas chromatography analysis.

11. An analytical instrument assembly comprising:
a gas chromatograph including a flow splitter configured to receive a sample;
a first detector coupled to the flow splitter;
a second detector coupled to the flow splitter; and
a pneumatic control module coupled to the flow splitter and configured to:
deliver a carrier gas to the flow splitter, the flow splitter being configured to split the sample and deliver at least a first portion of the sample to the first detector and at least a second portion of the sample to the second detector at a first split ratio; and
deliver one of (i) a makeup flow including a third portion of the carrier gas to the flow splitter or (ii) an exhaust flow out of the flow splitter, wherein the pneumatic control module is configured to regulate the pressure within the flow splitter to thereby maintain the first split ratio.

12. The analytical instrument assembly of claim 11, wherein the first detector is a mass spectrometer.

13. The analytical instrument assembly of claim 11, wherein the second detector is a flame ionization detector.

14. The analytical instrument assembly of claim 11, wherein the gas chromatograph includes an inlet and a primary column coupled to the inlet, the inlet configured to provide the sample and a first portion of the carrier gas to the primary column.

15. The analytical instrument assembly of claim 14, wherein the split ratio is defined as the flow to the second detector divided by the flow to the first detector at the point where the flow splitter splits the flow.

16. The analytical instrument assembly of claim 14, wherein the gas chromatograph includes a secondary column coupled to the primary column and configured to receive the sample and a modulator between the primary column and the secondary column.

17. The analytical instrument assembly of claim 11, wherein the flow splitter is configured to maintain the first split ratio throughout the course of a temperature-programmed gas chromatography analysis.

18. The analytical instrument assembly of claim 11, wherein the pneumatic control module is configured to control an exhaust flow from the flow splitter to thereby back pressure regulate the pressure within the flow splitter.

19. The analytical instrument assembly of claim 11, wherein the regulated pressure and the carrier gas are configured to control the amount of the second portion of the sample delivered to the second detector.

20. The analytical instrument assembly of claim 11, wherein the regulated pressure and the carrier gas are configured to control the amount of the first portion of the sample delivered to the first detector.

* * * * *